3,096,150
DEHYDRATION OF INORGANIC FLUORIDE HYDRATES WITH LIQUID HYDROGEN FLUORIDE
Donald R. Allen, Lake Jackson, Tex., assignor to The Dow Chemical Company, Midland, Mich., a corporation of Delaware
No Drawing. Filed May 5, 1958, Ser. No. 732,786
7 Claims. (Cl. 23—14.5)

This invention relates to dehydration of inorganic fluoride hydrates, and more particularly to the dehydration of aluminum fluoride hydrates and uranium tetrafluoride hydrates by use of liquid hydrogen fluoride.

Uranium and aluminum form fluoride hydrates which resist dehydration. Heating these salts as is commonly done to remove the water from the crystal structure is unsatisfactory. High temperatures must be used which result in dehydrofluorination of the salt. Thus a portion of the product is converted to an oxyfluoride salt which limits the utility of the salt.

It is, therefore, an object of this invention to provide a process for dehydration of aluminum fluoride and uranium tetrafluoride hydrates whereby anhydrous salts are obtained without partial dehydrofluorination.

According to the invention the above and other objects are attained by contacting a fluoride hydrate, such as aluminum fluoride hydrate or uranium tetrafluoride hydrate with liquid hydrogen fluoride. The liquid hydrogen fluoride, as a dehydration agent, removes the water of hydration from the salt without dehydrofluorination. After being contacted with the liquid hydrogen fluoride, the salt may be separated from the resulting liquid in anhydrous state.

The hydrates may be contacted with the liquid hydrogen fluoride in a batch or continuous process. A countercurrent continuous process may be used. One employing simple multistage contacts is preferred, since the dehydration may be effected with a smaller amount of the relatively anhydrous hydrogen fluoride. Even though a batch process is used, it is generally preferred to contact the salt several times with smaller amounts of the hydrogen fluoride instead of using a larger amount of the hydrogen fluoride at one time. For example, the hydrate may be first mixed with the relatively anhydrous hydrogen fluoride in given proportions. The resulting substantially dehydrated salt obtained by the initial contact with the liquid hydrogen fluoride is then separated from the resulting hydrogen fluoride solution and the salt is again contacted with more relatively anhydrous liquid hydrogen fluoride. In the first contact, the majority of the water of hydration from the hydrate is removed by the hydrogen fluoride. However, by contacting the salt again with additional relatively anhydrous liquid hydrogen fluoride, the fluoride is in contact with liquid hydrogen fluoride containing less water and further dehydration is obtained. The salt to be substantially completely dehydrated must be in contact with a liquid hydrogen fluoride solution containing less than 5 weight percent and preferably less than 1 percent by weight of water. By contacting the salt several times with smaller amounts of hydrogen fluoride instead of using a larger amount at one time, less relatively anhydrous liquid hydrogen fluoride is needed to finally contact the salt with the liquid hydrogen fluoride containing preferably less than 1 weight percent of water. In a countercurrent multistage process, sufficient amount of liquid hydrogen fluoride is used so that at the last stage the fluoride salt is in contact with liquid hydrogen fluoride containing preferably less than 1 weight percent of water.

Generally the hydrate is contacted with the hydrogen fluoride at a temperature in the range of 5 to 19° C. At a temperature in this range, the hydrogen fluoride is liquid at approximately atmospheric pressure and thus atmospheric pressure may be used in the process. Higher temperatures may be used, but pressurization is necessary to maintain the hydrogen fluoride in liquid phase. Lower temperatures, down to the freezing point of the hydrogen fluoride solution, may also be used but no particular advantage is gained and more energy has to be expended to cool the mixture to these lower temperatures.

The following examples further illustrate the invention.

*Example I*

To dehydrate aluminum fluoride, 50 grams of an aluminum fluoride hydrate containing 3½ moles of water per mole of aluminum fluoride were added to 200 milliliters of substantially anhydrous liquid hydrogen fluoride maintained at a temperature in the range of 10 to 19° C. The hydrate and the liquid hydrogen fluoride were agitated and then the solids were allowed to settle after which the resulting hydrogen fluoride solution so obtained was decanted. To the solids remaining after the decantation, an additional 200 milliliters of substantially anhydrous hydrogen fluoride were added and the mixture again agitated. The resulting solution of hydrogen fluoride was again decanted and the solids, wet with hydrogen fluoride, were transferred to a metal beaker and warmed to a temperature of approximately 150° C. to drive off the excess hydrogen fluoride. After evaporation of the hydrogen fluoride, an aluminum fluoride product was obtained which was substantially completely dehydrated.

*Example II*

To dehydrate uranium tetrafluoride hydrate, 50 grams of uranium tetrafluoride hydrate containing 2½ moles of water per mole of uranium tetrafluoride were added to 200 milliliters of substantially anhydrous liquid hydrogen fluoride. The hydrate and the liquid hydrogen fluoride were agitated and then the solids were allowed to settle after which the supernatant liquid decanted. To the solids remaining after the decantation, an additional 200 milliliters of substantially anhydrous liquid hydrogen fluoride were added. After mixing the solids with the newly added hydrogen fluoride, the resulting hydrogen fluoride solution was again decanted. The uranium tetrafluoride so obtained was warmed to a temperature of approximately 150° C. to dry off the hydrogen fluoride adhering to the solids.

The uranium tetrafluoride thus obtained was substantially completely dehydrated.

What is claimed is:

1. A process for the dehydration of an inorganic fluoride salt hydrate, which comprises contacting at atmospheric pressure an inorganic fluoride hydrate salt selected from the group consisting of aluminum fluoride hydrate and uranium tetrafluoride hydrate with liquid hydrogen fluoride containing less than 5 weight percent water to dehydrate the salt, and separating the dehydrated salt from the resulting liquid hydrogen fluoride solution.

2. A process according to claim 1 wherein the inorganic fluoride hydrate is contacted with the liquid hydrogen fluoride solution containing less than 1 weight percent of water at a temperature in the range of 5° to 19° C.

3. A process according to claim 2 wherein the inorganic fluoride hydrate is aluminum fluoride hydrate.

4. A process according to claim 2 wherein the inorganic fluoride hydrate is uranium tetrafluoride hydrate.

5. A process for dehydration of an inorganic fluoride salt hydrate, which comprises mixing at atmospheric pressure an inorganic fluoride salt hydrate selected from the group consisting of aluminum fluoride hydrate and uranium tetrafluoride hydrate with a liquid hydrogen fluoride in proportions such that the resulting hydrogen fluoride solution in contact with the salt contains less than 5 weight percent water to dehydrate the salt, and separating the dehydrated salt from the resulting hydrogen fluoride solution.

6. A process according to claim 5 wherein the inorganic fluoride salt hydrate is mixed with liquid hydrogen fluoride in proportion such that the resulting hydrogen fluoride solution in contact with the salt contains less than 1 weight percent of water at a temperature in the range of 5 to 19° C.

7. A process according to claim 6 wherein the inorganic fluoride salt hydrate is aluminum fluoride hydrate.

References Cited in the file of this patent

UNITED STATES PATENTS 2,784,059     McCaulay _____ Mar. 5, 1957

OTHER REFERENCES

Sidgwick, "Chemical Elements and Their Compounds," vol. 2, page 1104.

Mellor, "Comprehensive Treatise on Inorganic and Theoretical Chemistry," vol. 2, pages 129–131 (1922).

Katz et al., The Chemistry of Uranium (1951), page 360, McGraw-Hill Book Co., Inc., New York.